United States Patent [19]
Bauer et al.

[11] Patent Number: 5,604,753
[45] Date of Patent: Feb. 18, 1997

[54] METHOD AND APPARATUS FOR PERFORMING ERROR CORRECTION ON DATA FROM AN EXTERNAL MEMORY

[75] Inventors: John M. Bauer; Glenn J. Hinton, both of Portland; Gregory P. Meece; David B. Papworth, both of Beaverton, all of Oreg.

[73] Assignee: Intel Corporation, Santa Clara, Calif.

[21] Appl. No.: 177,861

[22] Filed: Jan. 4, 1994

[51] Int. Cl.$^6$ .................................................. G06F 11/10
[52] U.S. Cl. ................................. 371/40.1; 395/182.15
[58] Field of Search ....................... 371/40.1; 395/182.15

[56]  References Cited

U.S. PATENT DOCUMENTS

| | | | |
|---|---|---|---|
| 4,410,988 | 10/1983 | Suelflow et al. | 371/40.1 |
| 4,464,712 | 8/1984 | Fletcher | 395/449 |
| 4,598,402 | 6/1986 | Matsumoto et al. | 371/40.1 |
| 4,604,750 | 8/1986 | Manton et al. | 371/40.1 |
| 4,851,993 | 7/1989 | Chen et al. | 395/250 |
| 4,852,100 | 7/1989 | Christensen et al. | 371/40.1 |
| 5,226,126 | 7/1993 | McFarland et al. | 395/375 |
| 5,361,267 | 11/1994 | Godiwala et al. | 371/40.1 |

OTHER PUBLICATIONS

Popescu, Val; Schultz, Merle; Spracklen, John; Gibson, Gary; Lightner, Bruce; Isaman, David, "The Metaflow Architecture", IEEE Micro, Jun. 1991, p. Nos. 10–13 and 63–73.

Primary Examiner—Stephen M. Baker
Attorney, Agent, or Firm—Blakely, Sokoloff, Taylor & Zafman

[57] ABSTRACT

A method and apparatus for performing error correction on data from an external memory is described. The present invention includes a method and apparatus for receiving data from an external memory source and determining if the data has an error. The data is forwarded to the requesting unit while the error correction is performed on the data, such that the two operations are performed in parallel.

The present invention also includes a method and apparatus for subsequently correcting data if a single bit error exists. The corrected data is then forwarded to the requesting unit during the next cycle. Also if an error is detected, the present invention produces an indication to the device. The device is flushed in response to the indication.

29 Claims, 6 Drawing Sheets

METHOD AND APPARATUS FOR PERFORMING ERROR CORRECTION ON DATA FROM AN EXTERNAL MEMORY

FIELD OF THE INVENTION

The present invention relates to the field of error correction and computer systems; particularly, the present invention relates to performing error correction on data from an external, or off-chip, memory.

BACKGROUND OF THE INVENTION

The computer system can be divided into three basic blocks: a central processing unit (CPU), memory, and input/ output (I/O) units. These blocks are coupled to each other by a bus. Input devices such as a keyboard, mouse, disk drive, analog-to-digital converter, etc., are used to input instructions and data to the computer system via an I/O unit. These instructions and data can be stored in memory. The CPU retrieves the data stored in the memory and processes the data as directed by the stored instructions. The results can be stored back into memory or output via the I/O unit to any output device such as a printer, cathode-ray tube (CRT) display, digital-to-analog converter, etc.

Computer memories usually fall under two classes: read-only memories (ROMs) and random access memories (RAMs). ROM is commonly used for storing information that is not subject to change. The CPU can only retrieve data that is stored at a particular address. On the other hand, RAM allows for the access of stored memory (reading) and has ability to alter the stored data (writing). RAMs fall under two categories. Static random access memories (SRAMs) store binary data by traditionally using flip-flop logic gate configurations. In contrast, dynamic random access memories (DRAMs) are charged-storage capacitors with drive transistors. One problem associated with both SRAMs and DRAMs is data integrity. Stored data can be corrupted due to faults in the SRAM, DRAM or in associated controller circuitry (hard errors). Additionally, over time, transient errors (soft errors) occur randomly. These soft errors cannot be predicted. They are mainly caused by alpha particle radiations which might discharge memory capacitors in DRAMs and cause flip-flops in SRAMs to change state. Soft and hard errors can also be caused by noise on the transmission media, shorted buses, power surges, faulty bus drivers, etc.

The occurrence of data corruption can have a significant detrimental impact on the overall performance of the computer system. A single error may not only lead to an incorrect result but can even cause the computer program to crash. Thus, methods have been developed to indicate the occurrence of errors.

A simple error detection (EDC) can be implemented by appending a single parity bit at the end of a byte (8 bits) of data. Even or odd parity can be specified. For even parity, the parity bit added to the dataword is set to "0" if the number of 1s in the byte is even. Otherwise, the parity bit is set to "1". For odd parity, the parity bit added to the dataword is set to "0" if the number of 1s in the byte is odd. Consequently, the total number of 1s in a byte, including the parity bit, should be even for even parity and odd for odd parity. A more sophisticated approach involves not only detecting the error but also correcting it as well. These are referred to as error correction codes (ECCs) An example of a commonly used ECC is the Hamming code or the modified Hamming code. The Hamming code principle consists of using several check bits to refine error detection to the point where it is possible not to just detect single bit errors but also to pinpoint their locations. Once the error bit is located, it can be corrected by complementing that bit. The number of check bits required to perform error correction depends on the length of the data string. Given n check bits, a data string having $2^{(n-1)}-1$ bits can be protected with double bit error detection and single error bit correction. By using ECC, the meantime between failures is extended, which leads to improved reliability to the overall computer system.

Most often, error correction codes are employed when data is transferred between a transmitting subsystem, such as an I/O device or a processor, and the memory of a receiving subsystem. ECC codewords (i.e., ECC parity bits derived from the original codewords prior to being transmitted plus the original codewords) are transmitted and stored in the memory of this receiving subsystem. The ECC codewords are stored at the address specified by the transmitting subsystem. When the memory of the receiving subsystem is subsequently accessed by the same address, the data portion of the accessed ECC codewords is utilized to generate a subsequent set of parity bits. The original parity bits are then compared to the subsequent set of parity bits by performing an exclusive-or (XOR) logic operation on the corresponding bits. The resulting code from the XOR operation is referred to as the error syndrome code. The error syndrome code indicates whether an error has occurred in the data or parity bit portion of the subsequently accessed ECC codewords. When the error syndrome code is decoded, the bit location in the ECC codeword in which the error has occurred is identified. Thus, the system detects if any errors have occurred in the transmission of the ECC codewords-including errors that may have occurred in the parity bits themselves.

In the prior art, the use of ECC codes including the data detection is performed before the data is used by the system. In other words, where data is transferred from the memory system to a device for use, the error detection and correction occurs before the data is actually utilized by the system. Therefore, there is a delay due to performing the error detection and correction that exists before data being transferred is ready for use. However, given a 16 megabyte DRAM memory system using 256 K DRAMs with a 0.30% per thousand soft error rate, a single-bit soft error occurs only once in approximately 24–48 days. Thus, the occurrence of an error is very rare. Because errors are so rare, the delay that is incurred before the data may be used is an undue delay. It is desirable to be able to receive data and use the data as soon as it is received while still compensating for any possible errors in the data that may be detected and corrected.

The present invention provides for performing error correction on data that is transferred to a device, such that the device is able to use the data immediately upon receiving it. The present invention provides for performing error correction on the data transferred from the level two (L2) cache memory.

SUMMARY OF THE INVENTION

A method and apparatus for performing error correction on data from an external memory is described. The present invention includes a method and apparatus for receiving data from an external memory source and determining if the data has an error. The data is forwarded to the requesting unit while the error correction is performed on the data, such that the two operations are performed in parallel.

The present invention also includes a method and apparatus for subsequently correcting data if a single bit error exists. The corrected data is then forwarded to the requesting unit during the next cycle. Also if an error is detected, the present invention produces an indication to the device. The device is flushed in response to the indication.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

A method and apparatus for performing error correction is described. In the following detailed description of the present invention numerous specific details are set forth, such as specific numbers of bytes being transferred, specific timings, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid unnecessarily obscuring the present invention.

Overview of the Memory Subsystem

Figure 1:
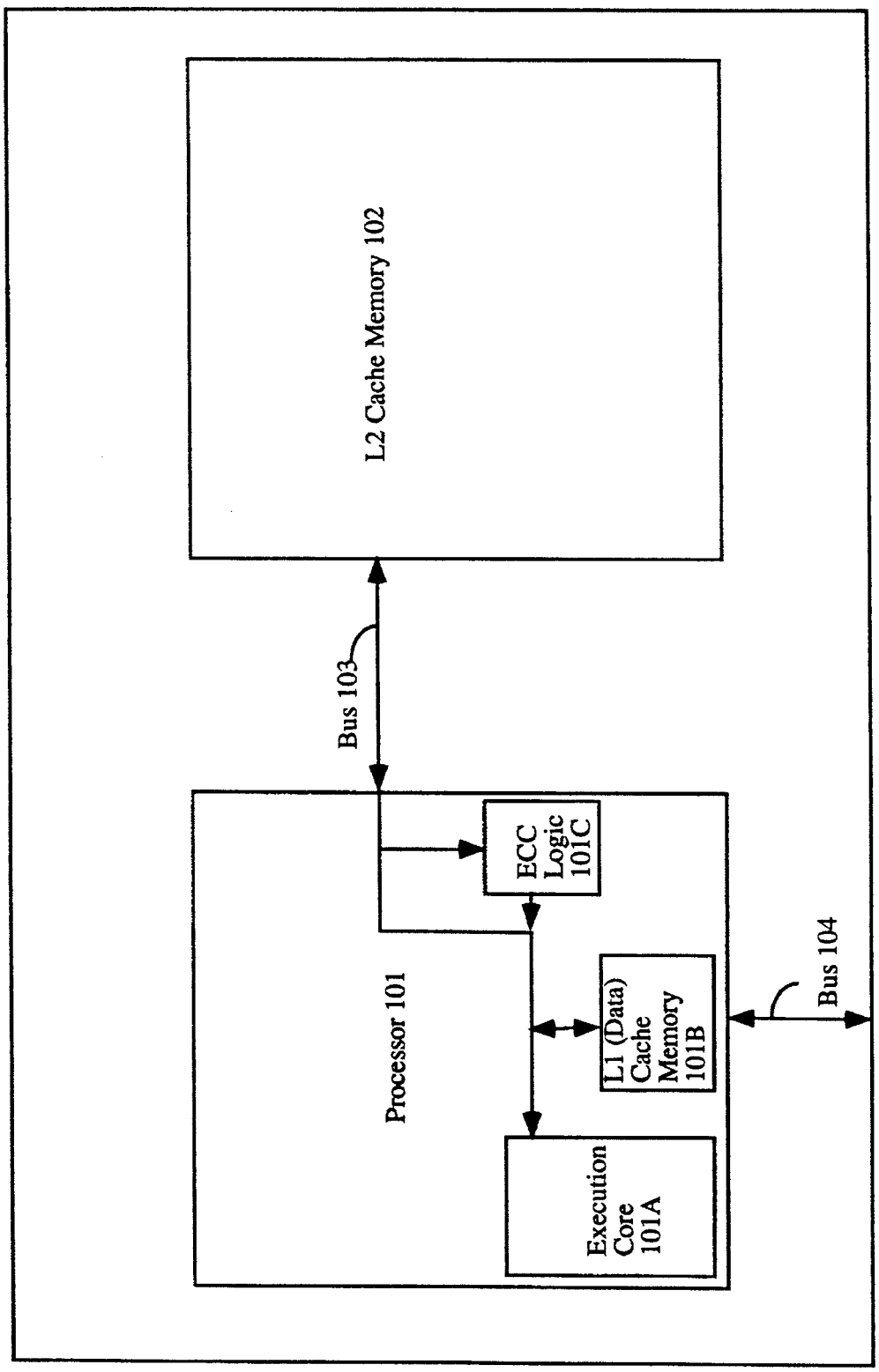
FIG. 1 is a block diagram of one embodiment of the memory arrangement between the processor and level two (L2) cache memory of the present invention.

FIG. 1 illustrates the processor and L2 cache memory arrangement of the present invention. Referring to FIG. 1, processor 101 is coupled to a level two (L2) cache memory 102 by bus 103. Bus 103 is referred to herein as the backside bus. Processor 101 is also coupled to a system bus (not shown) via bus 104. In one embodiment, L2 cache memory 102 may also be coupled to the system bus via its own dedicated bus. Processor 101 and L2 cache memory 102 may be contained in a dual cavity integrated circuit package.

In one embodiment, processor 101 of the present invention is an Intel Architecture Microprocessor such as manufactured by Intel Corporation of Santa Clara, Calif., the corporate assignee of the present invention. Processor 101 of the present invention includes an execution core 101A for executing instructions using data from memory. In the present invention, processor 101 may also include a level one (L1), or data, cache memory, shown as cache memory 101B. L1 cache memory 101B is coupled to provide data to the execution core 101A. Execution core 101A is also coupled to receive data from L2 cache memory 102 via bus 103. ECC logic 101C is coupled to receive data from L2 cache memory 102 (i.e., an external memory) and perform error correction on such data, if necessary, thereafter forwarding the corrected data to L1 cache memory 101B and execution core 101A. One embodiment of the processor of the present invention will be described further below.

In one embodiment, L1 cache memory 101 and L2 cache memory 102 comprise static random access memories (SRAMs) that include data, a cache directory and cache management logic. Data is stored in a data storage array (e.g., a data cache RAM). The cache directory may include a tag array, tag status and least recently used (LRU) bits. The tag array may include a tag RAM. The cache management logic includes the logic to perform tag matching, a replacement algorithm and data routing to satisfy the memory requests from processor 101. The operation and use of the data storage array, cache directory and the cache management logic are well-known in the art.

In one embodiment, L2 cache memory 102 is a 4-way set associative cache memory that uses physical addresses. L2 cache memory 102 is block oriented with a 32-byte line size divided into four 8-byte "chunks". In one embodiment, L2 cache memory 102 stores 512 Kbytes of information. L2 cache memory 102 may be designed to store other amounts of information, such as 256 Kbytes of information.

The L2 cache memory 102 communicates with processor 101 using bus 103. In one embodiment, bus 103 includes an address bus for sending addresses from processor 101 to L2 cache memory 102, a bi-directional data bus, a command bus for sending commands from processor 101 to the L2 cache memory 102 and a bi-directional status and state bus. Note that this bi-directional bus may comprise two unidirectional buses, one for status and another for state, each transmitting information. Bus 103 is internal to the package when processor 101 and L2 cache memory 102 are contained in the same package. In one embodiment, bus 103 is a full frequency (150 MHz), non-multiplexed bus with a 64-bit wide data bus with error correction coding (ECC), a 36-bit address bus, 24 control pins, 12 data integrity pins plus a reset signal and a clock signal. Each 8-byte quantity on the data bus is referred to herein as a "chunk".

In the present invention, L2 cache memory 102 and processor 101 operate at different speeds. In one embodiment, L2 cache memory 102 operates at 133–150 MHz and processor 101 operates at 133–150 MHz. In one embodiment, bus 103 provides for communication between L2 cache memory 102 and processor 101 and operates at 150 MHz.

Included along with each L2 data array 32-byte line are 32 data integrity bits. (Eight bits are stored with each 64 bit block). The L2 cache memory regards these extra bits as extensions of the data array line and does not interpret, nor generate these bits.

It should be noted that the present invention may operate in conjunction with any external memory returning data to the processor or other similar device for use by the device. Although any type of external memory may be used, the present invention will be described in terms of an L2 cache memory as the external memory source.

When processor 101 requests information from the main system memory, the memory request is sent to L1 cache memory 101A. Cache management logic receives the memory request and compares it to the stored addresses in a tag RAM. When the memory request address matches an address stored in the tag RAM (i.e., an L1 cache hit), cache memory 101A returns the information from a data cache RAM corresponding to the matched addressed in the tag RAM. If the memory request does not match any entry in the tag RAM directory (i.e., an L1 cache miss), the memory request is passed on to external memory, such as L2 cache memory 102. In this case, an address is placed on the address bus portion of bus 103 and an address strobe is sent to L2 cache memory 102 to indicate that the address bus is carrying a valid address (transaction). The same tag matching occurs between the memory request and the stored addresses in the tag RAM of L2 cache memory 102. If the memory request matches an address stored in the tag RAM (i.e., an L2 cache hit), L2 cache memory 102 returns the information from a data cache RAM within L2 cache memory 102 and a copy is stored in cache memory 101A for future use. In one embodiment, the data is returned directly to execution core 101A of processor 101 to permit usage of the data in the subsequent operations performed therein. If the memory request does not match any entry in the tag RAM directory of L2 cache memory 102 (i.e., an L2 cache miss), the memory request is passed onto the main system memory. When the information requested is returned from the main memory to processor 101, a copy is stored in both cache memory 101A and L2 cache memory 102 for future use.

In one embodiment, because bus 103 is only eight bytes (64 bits) wide, four clocks are required to return a full cache line from L2 cache memory 102. In the present invention, the execution core 101A may only desire one or more specific bytes within one of the four chunks. The chunk containing these bytes of interest is referred to herein as the critical chunk. Upon return from L2 cache memory 102, the chunks may be ordered such that the critical chunk is returned first. For instance, if the byte of interest is chunk 0, chunk 0 is returned followed by chunks 1, 2 and 3 in numerically ascending order. On the other hand, if chunk 1 is the chunk of interest, the chunk 1 is returned first, while the remaining chunks may be returned chunk 0, chunk 3, and then chunk 2. If chunk 2 is the chunk of interest, the chunks may be returned chunks 2, 3, 0, 1. Also, if chunk 3 is the chunk of interest, the chunks may be returned in reverse order, chunks 3, 2, 1, 0. The critical chunk is determined by the lower two address bits.

As described above, an 8-bit quantity is stored in each cache line for every 8 bytes of data in L2 cache memory 102. Therefore, there are a total of 4 bytes stored per 32 byte cache line. These include the ECC bits. In the present invention, these 8 bits protect the 64 bits. In the present invention, if a single bit is corrupted, that particular bit may be detected and corrected. If any two bits in a chunk are detected to be in error, the existence of the errors may be detected. In one embodiment, this is referred to as a double bit error. It should be noted that these bit errors may be due to the soft errors or a lost bit when data is returned during transmission or storage.

In the present invention, the desired data returned is sent directly to execution core 101A for immediate use, while the error correction is performed in parallel by ECC logic 101C. Thus, the present invention bypasses the data directly to the execution core 101A without error correction initially. This differs in the prior art wherein the returned data undergoes error correction and is then sent on to the processor core. This allows execution core 101A to use the data while that chunk containing the data is being examined in parallel to determine if it contains an error. If a single bit error is detected in a particular chunk, the chunk is corrected by ECC logic 101C, and subsequently forwarded to L1 cache memory 101B. At the same time, ECC logic 101C provides an indication to execution core 101A instructing that the data and instructions corresponding to instructions and operations subsequent to and including the operation responsible for causing the memory request should be purged from execution core 101A. In one embodiment, a reorder buffer (ROB), described later, receives the indication to purge and ensures that instructions subsequent to and including the operation causing the fetch to occur are not committed to the processor state (in program order). Operations and data are removed from execution core 101A and the entire state up to the request is flushed from processor 101, and processor 101 begins processing again at the location of the fetch to memory. When the fetch occurs again, the data will be in L1 cache memory 101B, wherein L1 cache memory 101B hits and supplies the data. In this manner, the request does not have to go to external memory (e.g., L2 cache memory 102).

Figure 2:
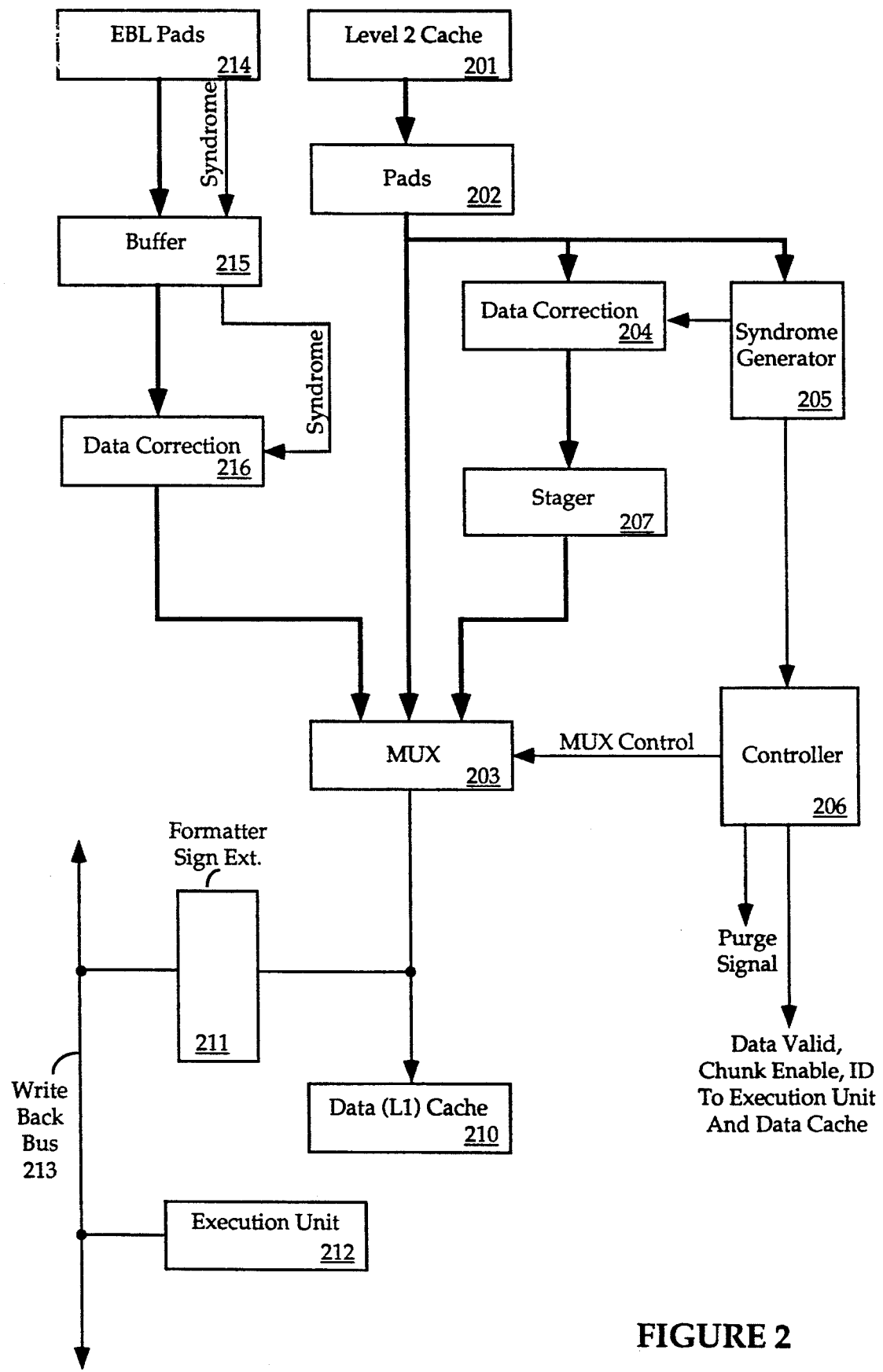
FIG. 2 is a data flow diagram illustrating the flow of data between the processor of the present invention and the L2 cache memory.

FIG. 2 illustrates the data path between the L2 cache memory and the processor, bus controller including the ECC correction. Referring to FIG. 2, L2 cache memory 201 is coupled to provide data to pads 202. Pads 202 are coupled to provide data to an input of data correction block 204 and multiplexer (MUX) 203, and status and state information accompanying the data regarding the current cache line, such as hit/miss indication, parity information (e.g., bits), MESI protocol information, to syndrome generator 205. Data correction block 204 is also coupled to receive control signals from syndrome generator 205 as well as being coupled to the input of stager 207. The output of stager 207 is coupled to another input of MUX 203. The other input of MUX 203 is coupled to the output of data correction block 216. Data correction block 216 is coupled to receive data, as well as syndrome information, from buffer 215. Buffer 215 is coupled to receive the data and syndrome information from the external bus logic (EBL) pads 214.

MUX 203 is coupled to and responsive to a control signal from control block 206. Controller block 206 is coupled to receive an output from syndrome generator 205, and provides an indication in the form of one or more signals to the remainder of the processor. The output of MUX 203 is coupled to data cache memory 210 and formatter/sign extension block 211. The output of formatter 211 is coupled to writeback bus 212. Execution unit 212 is also coupled to receive the data on the writeback bus.

MUX 203, in response to MUX control signal from controller 206, provides data from one of its three inputs to data cache memory 210 and the execution unit 212, via formatter 211 and writeback bus 212. MUX 203 provides data from memory on the external bus from pads 214, buffer 215 and data correction block 216. MUX 203 provides data directly from the L2 cache memory 201 from pads 202 or ECC corrected data from L2 cache memory 201 supplied by stager 207. In one embodiment, stager 207 is a register.

Regardless of the source of the data, the data is written into data cache memory 210. When multiple chunks are being returned in response to a request, the data is stored in a temporary buffer (not shown) until all of the requested data is received, and then the data is written into data cache memory 210. Formatter 211 also receives the data and formats it depending on the type of data. For instance, if the data is floating point data, then the data returned from memory is converted from a memory format into an internal floating point format. Similarly, where the data is integer data, a sign extension may be required. These formatting operations are well-known in the art. The data is then supplied to execution unit 212 via writeback bus 213 for use. In one embodiment, execution unit 212 may be an arithmetic logic unit (ALU) or a floating point unit.

When the desired data is being returned from L2 cache memory 201 in response to a miss to the L1 cache memory 210, the data is received by pads 202 and supplied to data cache 210 via MUX 203 and data correction block 204 one chunk at a time. The data and ECC bits for each chunk are received by the syndrome generator 205. Data correction block 204 corrects any single bit errors in the chunk. In one embodiment, data correction block 204 corrects the single bit errors using Fujiwara error correction to produce ECC corrected data, which is well-known by those skilled in the art. It should be known that any error correction method may be used, such as Hamming error correction. After each chunk is corrected by data correction block 204, the ECC corrected data is sent to stager 207 which stages the data for input to MUX 203.

Data correction block 204 operates in response to control signals from syndrome generator 205. Syndrome generator 205 compares the stored ECC bits with ECC correction bits calculated from the data itself. Syndrome generator 205 then defines which data bit must be corrected and causes that data bit to be inverted in data correction block 204. In one embodiment, syndrome generator 205 also uses an additional check bit to detect all double errors in each chunk. However, in the present invention, only the single errors are corrected. In another embodiment, double bit errors may also be corrected. The use and operation of syndrome generator 205 and data correction block 204 are well-known to those skilled in the art.

When data is being received in response to an L2 cache memory hit, syndrome generator 205 indicates the existence of the error to controller 206. If syndrome generator 205 indicates that the data does not contain errors, then controller 206 causes MUX 203 to continue outputting data directly from pads 202. If syndrome generator 205 detects the existence of a single bit error, then controller 206 causes MUX 203 to output the data from stager 207. Note that controller 206 also generates one or more signals to the execution core to indicate the validity of the data, or lack thereof. Note that the detection of double bit errors results in an interrupt being generated and handled by an interrupt routine(s) in a manner well-known in the art.

Due to the time necessary to perform the data correction, the corrected data is not available at MUX 203 the same time as the original data entered from pads 202. In the present invention, corrected data for one chunk is available from stager 207 to MUX 203 at the same time data for the subsequent chunk is available from pads 202 to MUX 203. Controller 206 provides the MUX control signal for selecting either the next chunk of data from pads 202 or the error corrected version of the previous chunk.

Any data requests to memory on the external bus are handled through EBL pads 214, buffer 215 and data correction block 216. Data is received at pads 214. In one embodiment, pads 214 include a syndrome generator (not shown) to produce syndrome information from the data received by pads 214 from the external bus. The data received from the external bus is stored with its syndrome information in buffer 215. The data is then transferred to data correction block 216 when it is corrected, if necessary, according to the syndrome information also received from buffer 215. The data is then forwarded to data cache 210 and the writeback bus 213 via MUX 203.

In one embodiment, the data correction, including syndrome generation, as well as the necessary buffering or staging is included in the bus controller logic of the processor of the present invention.

Figure 3:
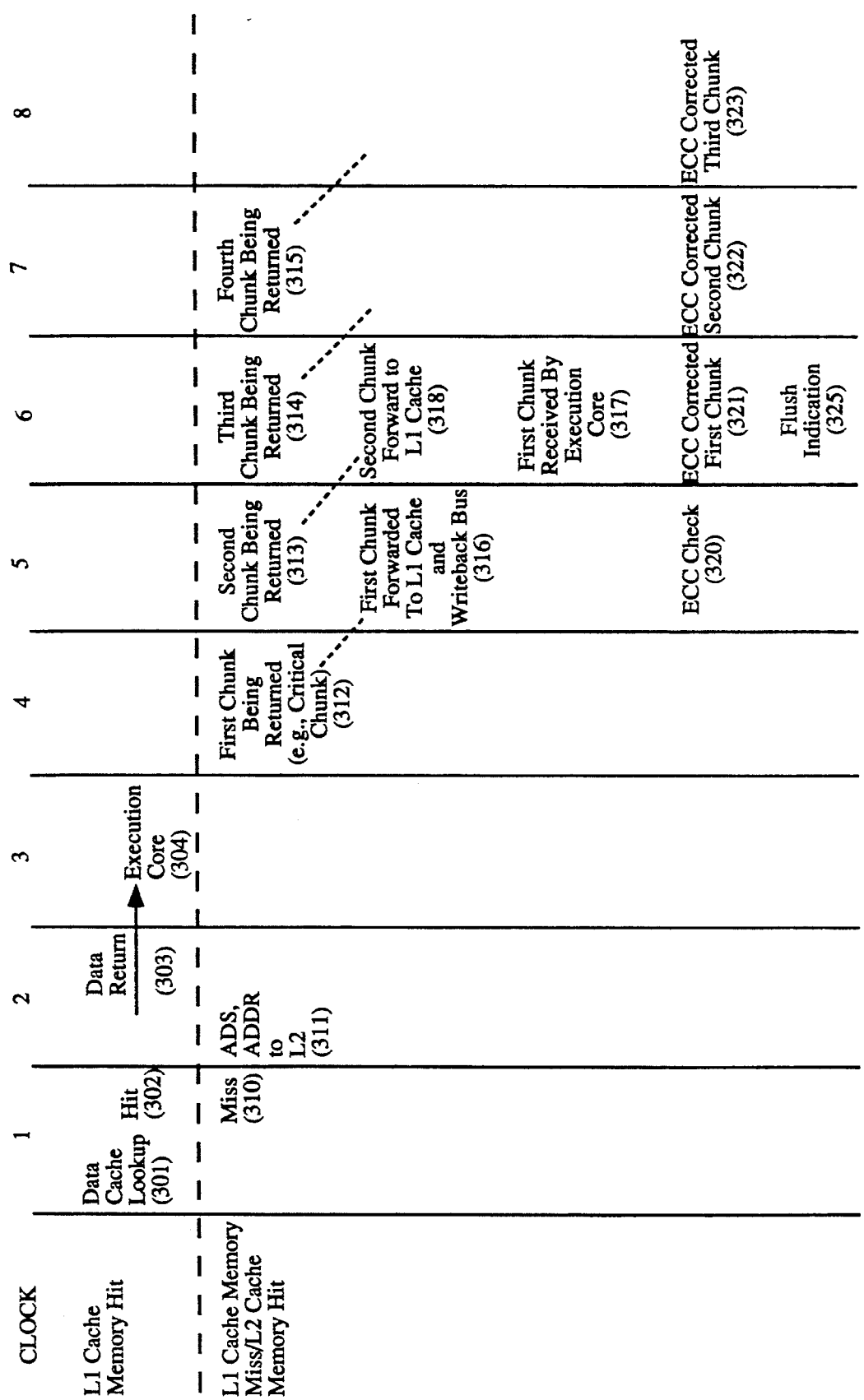
FIG. 3 is a timing diagram illustrating cache memory accesses according to the present invention.

FIG. 3 is a timing diagram depicting the data flow of the present invention for an L1 cache hit (301–304) and an L1 cache miss/L2 cache hit (310–315). Referring to FIG. 3, each of the clock cycles are labeled 1, 2, 3, 4, etc. In clock cycle 1, a cache look-up (310) occurs to data cache memory 210. The cache look-up includes the virtual address to physical address translation. This translation occurs in a manner well-known to those skilled in the art. The cache look-up also includes performing well-known tag matching to identify whether the desired data is stored in the data cache memory 210 (i.e., a hit) or whether it is not (i.e., a miss). At the end of clock 1, a determination is made as to whether a hit (302) or a miss (310) occurred. If the data is a hit, then the data is returned from the L1 cache memory (303) in clock 2 for use by the execution core (304) during clock 3.

If at the end of clock 1, the tag matching logic determines that there is a miss to the L1 cache memory (310), then the address of the request is sent on the address bus to the L2 cache memory and an address strobe is asserted by the processor (311) during the first half of clock 2 indicating that a valid address is on the address bus. The sending and strobing of the address when performing a memory access are performed in a manner well-known in the art.

In the present invention, due to the time required to access the L2 cache memory as a separate chip, the first chunk is returned in clock 4. Note that the first chunk may be the critical chunk. The data is transferred across the backside bus, where the data is latched. The data is then forwarded from pads 202 to data cache memory 210 and writeback bus 213 (after formatting) in a single clock, where the data is latched and ready for use by execution unit 212 at the end of this clock. In this manner, execution unit 212 may operate on the data during the next clock.

In one embodiment, the first chunk is returned and latched at the end of clock 4 (312). During clock 5, the first chunk is forwarded to the L1 cache memory (210) and the writeback bus 213 (in formatted form) and latched (316). The present invention uses the bypass mechanism described above to send the returned data directly to the writeback bus 213 during clock 5 for access by the execution unit 212.

Also during clock 5, the second chunk of data is returned from the L2 cache memory (313). In fact, the four chunks of data are returned in four successive clock cycles from the L2 cache memory. For instance, the first, second, third and fourth chunks return in clocks 4, 5, 6 and 7 from the L2 cache memory respectively (312–315), such that each is latched at the end of its respective clock cycles. Also, the four chunks are sent to L1 cache memory 210 in successive clock cycles 5–8 respectively. However, in the present invention, only one of the chunks is forwarded to the writeback bus (316).

All of the data, including chunks that are not required for use immediately by execution unit 213, are written into a line fill buffer. The data in the line fill buffer is then written into L1 cache memory 213. All of the chunks are written during a cache line write operation when the data for the entire cache line has been written into the line buffer. Note that L1 cache memory 213 includes the logic (not shown) necessary to prevent undesired data from the returned cache line from being written onto the writeback bus 213.

While the data is returning to the data cache memory, an ECC check (320) is performed in parallel. For instance, in clock 5, when the first chunk in being forwarded while an ECC check is performed on the first chunk in parallel to determine is the chunk contains any single bit or double bit errors. If it is determined that the first returning chunk has a correctable error, the ECC corrected version of the first chunk is ready by clock 6 (321). Thus, in the present invention, the ECC corrected chunk is available one clock later than the originally transferred chunk. The corrected data is produced and multiplexed into the system. Thus, a one clock latency is set for subsequent chunks and their return. The first, second and third ECC corrected chunks are shown being produced in clock cycles 6–8 respectively (321–323).

The corrected data is latched into stager 207 which stages it for one clock. Controller 206 then controls the data that is ultimately sent to L1 cache memory 210. For instance, if the first chunk contains an error, then corrected version of the first chunk is received at the next clock followed by the second chunk, the third chunk and the fourth chunk. On the other hand, if an error is detected in the second chunk, then L1 cache memory 210 receives the first chunk, then the second chunk from pads 202, followed by the error corrected second chunk with the third and fourth chunks of data following thereafter. In the present invention, any or all of the bytes may receive error correction.

Also if the ECC check determines that a bad single bit exists in the data, the present invention produces one or more signals indicating that the data used by the execution unit and in any subsequently performed operations, as supplied from the L2 cache memory, is not correct. These signals are sent to the execution core of the processor. In one embodiment, a single signal is sent (325) in the same clock cycle as the ECC corrected data is available. The indication sent to the execution core of the processor indicates to the processor that the data is not correct and causes a refetch.

The indication signal(s) also cause the execution pipeline to be flushed. In the present invention, all of the data produced and operations issued subsequent to the instruction responsible for the fetch are flushed. In one embodiment, the flushing of the execution pipeline occurs when the fetch operation responsible for using the error filled data is about to cause the state of the machine to be permanently changed due to its completion. In other words, the flushing occurs when the fetch operation is to retire. Since the fetch operation only requires a single clock to perform when receiving the data, it is ready to retire during the next clock cycle. The indication produced by the present invention prevents the retirement of the fetch operation and flushes the execution pipeline at that point.

When the execution core of the processor continues execution, the fetch operation is repeated this time using data from L1 cache memory 210 since the data, including the ECC corrected data has been saved in L1 cache memory 210. In this case, the L2 cache memory does not have to reaccessed to obtain the data.

Therefore, the present invention allows for performing error correction on data from an external memory source and still provide the data directly to the core of the processor for immediate use as soon as the data is received from the external memory source. Thus, the processor of the present invention does not have to be slowed to accommodate the rare occurrence of an ECC error.

Furthermore, the present invention provides for single bit correction without having to interrupt the processor, and thus, no degradation to the pipeline. Because this occurs in hardware, the software application being run is completely unaware of its occurrence. Thus, the present invention performs the error correction operation transparent to the software application and, thus, the user.

Moreover, the present invention uses staging to prevent data from being lost when an error is detected and correction is performed. Since the ECC corrected version of a chunk is available when the following chunk is received from the L2 cache memory, the present invention avoid losing the following chunk of data by forcing all of the received data from the ECC corrected chunk to proceed through the stager 207. This is referred herein as the ECC staged mode, wherein controller 206 causes MUX 203 to supply L1 cache memory 210 with the data being output from stager 207. Controller 206 continues selecting data from stager 207 until there is at least a one clock window in the data return that permits controller 206 to have the data provided directly from pads 202 while not losing any data. Note that the data is always being corrected in the ECC staged mode whether needed or not.

Overview of the Computer System of the Present Invention

Figure 4:
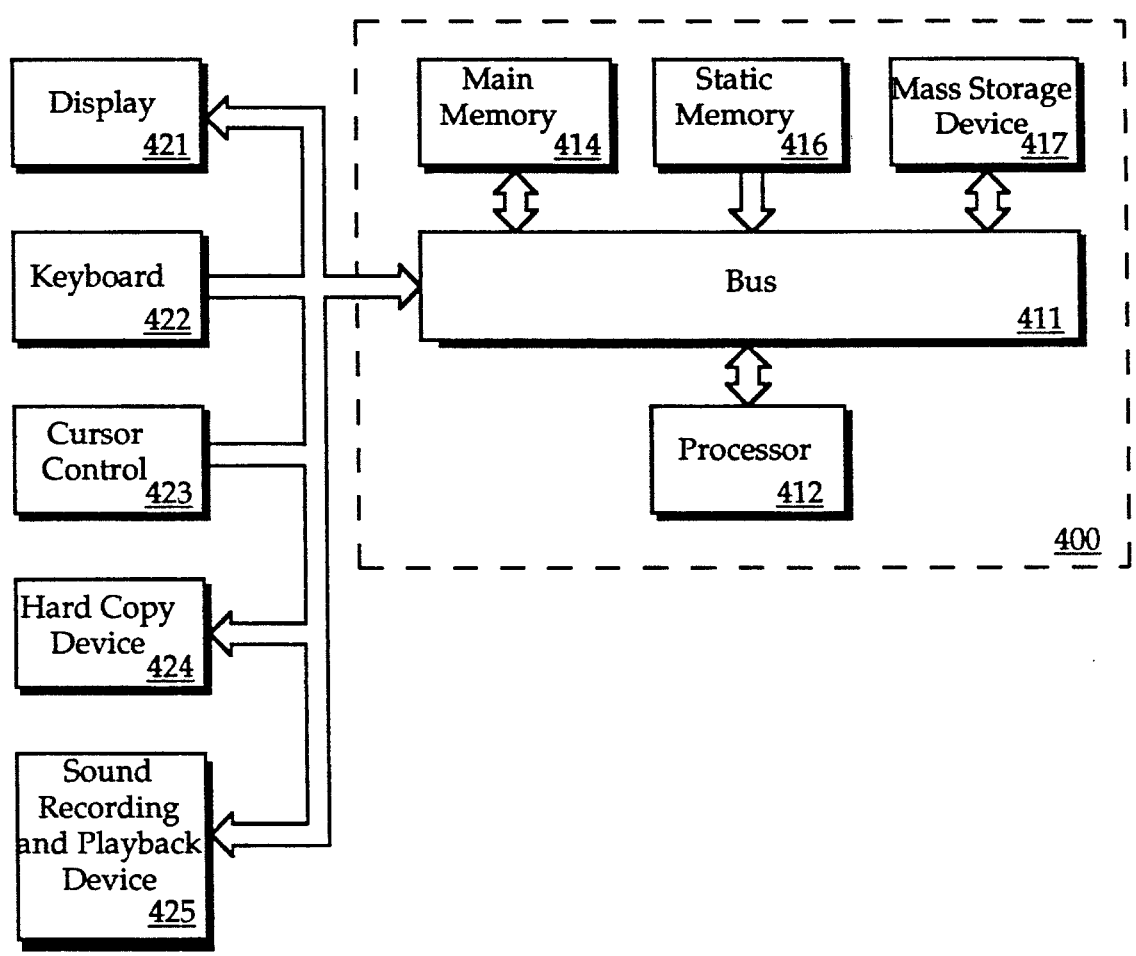
FIG. 4 is a block diagram of one embodiment of the computer system of the present invention.

Referring to FIG. 4, the computer system upon which a preferred embodiment of the present invention is implemented is shown as 400. Computer system 400 comprises a bus or other communication means 411 for communicating information, and a processing means 412 coupled with bus 411 for processing information. Processor 412 includes, but is not limited to microprocessors such as an Intel® Architecture Microprocessor, manufactured by Intel Corporation of Santa Clara, Calif., the corporate assignee of the present invention, PowerPC™, Alpha™, etc. System 400 further comprises a random access memory (RAM) or other dynamic storage device 414 (referred to as main memory), coupled to bus 411 for storing information and instructions to be executed by processor 412. Main memory 414 also may be used for storing temporary variables or other intermediate information during execution of instructions by processor 412. Computer system 400 also comprises a read only memory (ROM) and/or other static storage device 416 coupled to bus 411 for storing static information and instructions for processor 412, and a data storage device 417 such as a magnetic disk or optical disk and its corresponding disk drive. Data storage device 417 is coupled to bus 411 for storing information and instructions.

Computer system 400 may further be coupled to a display device 421, such as a cathode ray tube (CRT) or liquid crystal display (LCD) coupled to bus 411 for displaying information to a computer user. An alphanumeric input device 422, including alphanumeric and other keys, may also be coupled to bus 411 for communicating information and command selections to processor 412. An additional user input device is cursor control 423, such as a mouse, a trackball, stylus, or cursor direction keys, coupled to bus 411 for communicating direction information and command selections to processor 412, and for controlling cursor movement on display 411. Another device which may be coupled to bus 411 is hard-copy device 424 which may be used for printing instructions, data, or other information on a medium such as paper, film, or similar types of media. Furthermore, a sound recording and playback device, such as a speaker and microphone may optionally be coupled to bus 411 for interfacing with computer system 400. Note that any or all of the components of system 400 and associated hardware may be used in a preferred embodiment, however, it can be appreciated that any type of configuration of the system may be used for various purposes as the user requires.

Figure 5:
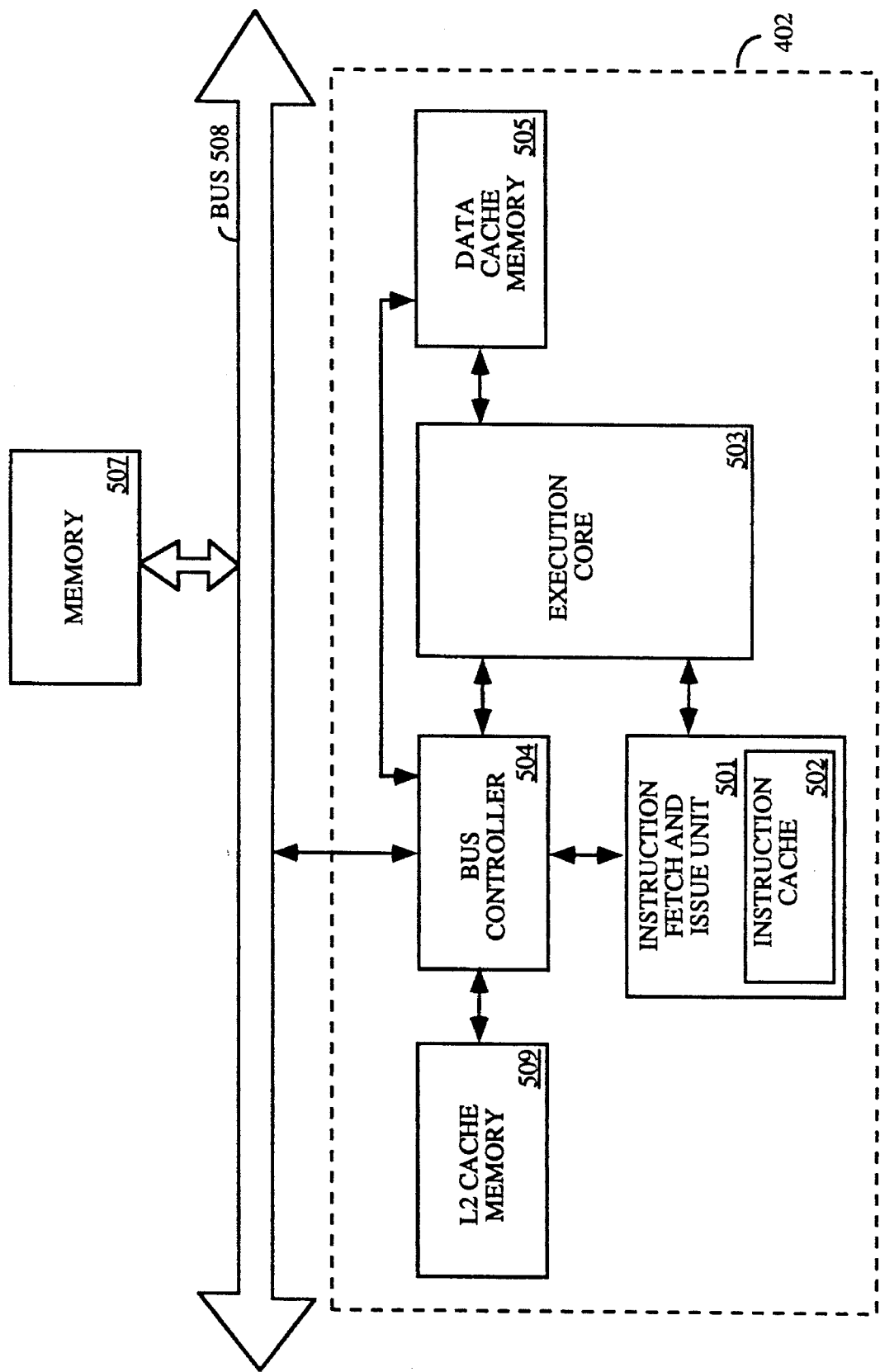
FIG. 5 is a block diagram of one embodiment of the processor of the present invention.

FIG. 5 is a block diagram of the memory subsystem of the computer system of the present invention. Referring to FIG.

5, the memory subsystem comprises an instruction fetch and issue unit 501 with an integrated instruction cache 502, an execution core 503, a bus controller 504, a data cache memory 505, a memory unit 507, bus 508 and L2 cache memory 509.

The memory unit 507 is coupled to the system bus. The bus controller 504 is coupled to the bus 508. The bus controller 504 is also coupled to the data cache memory 505 and the instruction fetch and issue unit 501 and L2 cache memory 509. The instruction fetch and issue unit 501 is also coupled to the execution core 503. The execution core 503 is also coupled to the data cache memory 505. In the present invention, the instruction fetch and issue unit 501, the execution core 503, the bus controller 504, and the data cache memory 505 together comprise the processor 402 (FIG. 4). In the present invention, elements 501–505 cooperate to fetch, issue, execute and save the execution results of instructions in a pipelined manner. In one embodiment, processor 402 and L2 cache memory 509 are contained in the same integrated circuit package.

The instruction fetch and issue unit 501 fetches instructions from an external memory, such as memory unit 507, through the bus controller 504 via bus 508, or any other external bus. The fetched instructions are stored in instruction cache 502. The bus controller 504 manages transfers of data between external components such as memory 507, L2 cache memory 509 and the processor 412. In addition, it manages cache coherency transfers. The instruction fetch and issue unit 501 issues these instructions in order to the execution core 503. The execution core 503 performs arithmetic and logic operations, such functions as add, subtract, logical AND, and integer multiply, as well as memory operations, such as loads and stores. Some instructions are fetched and issued speculatively.

The execution core 503 includes an execution unit that holds and executes the integer and floating point instructions when their operand dependencies on execution results of preceding instructions are resolved, including those integer and floating point instructions that are speculatively fetched and issued. Similarly, the execution core 503 also includes a memory execution unit that holds, executes and dispatches load and store instructions to the data cache memory 505 (as well as external memory) as soon as their operand dependencies on execution results of preceding instructions are resolved, including those load and store instructions that are speculatively fetched and issued. In one embodiment, the execution core 503 includes a mechanism for committing the states of executed instructions to whatever permanent architectural state that was designated by the original source code.

Execution core 503 controls access to data to/from data cache memory 505. Data cache memory 505 is a fast, small, hardware-maintained scratch pad memory which can be accessed in fewer clock cycles than main memory by loads and stores. The data cache memory 505 respond to the load instructions immediately, forwarding data if necessary, whereas the store instructions are buffered. In other words, the instructions are not necessarily executed/forwarded in the order they were issued, and some instructions are speculatively executed/forwarded. However, the execution results of the integer, floating point and load instructions are buffered, and then committed to processor state in program order. The buffer and store instructions are committed to processor state in program order and then executed in the "background", at the convenience of the memory system. Speculative integer, floating point and load execution results and buffer stores of mis-predicted branches are purged, as are any results produced or derived from the use of data containing errors. Note that the speculative nature of fetched, issued and executed instructions is attributed to the uncertainty of whether a particular instruction or set of instructions is to be executed due to an unaffirmed branch prediction.

Instruction fetch and issue unit 501 is intended to represent a broad category of instruction fetching and issuing elements found in many computer systems. Their constitutions and functions are well-known and will be described only as necessary with reference to later figures.

The bus controller 504, the bus 508, and the memory 507 are also intended to represent a broad category of these elements found in most computer systems. Their functions and constitutions are well-known and will not be described further. The execution core 503, incorporating with the teachings of the present invention, and the data cache memory 505 will be described further in detail below with additional references to the remaining figures.

Figure 6:
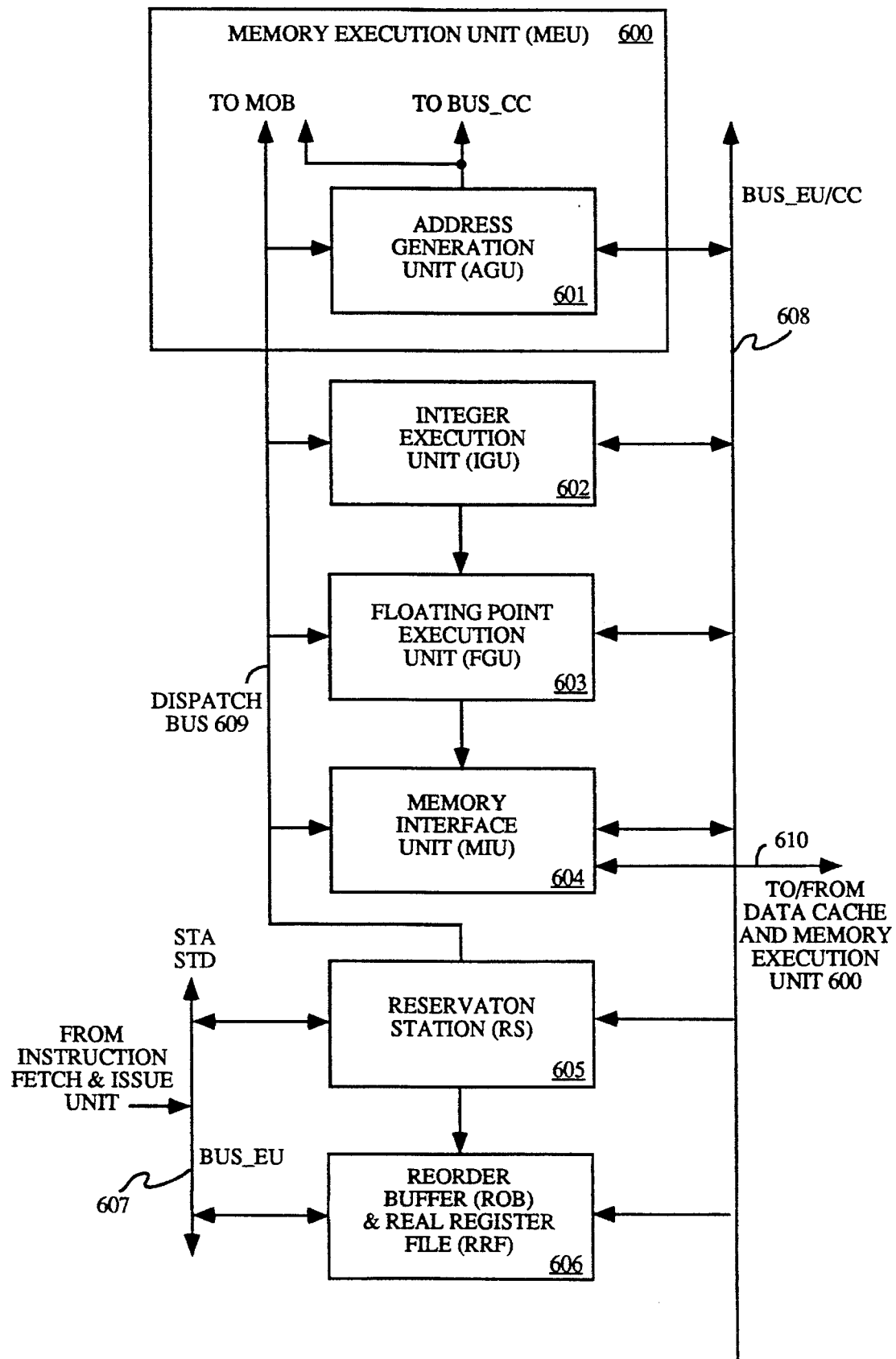
FIG. 6 is a block diagram of the execution unit of the present invention.

FIG. 6 is a block diagram of one embodiment of the execution core of the present invention. Referring to FIG. 6, execution core 503 comprises a reservation station (RS) 605, a memory execution unit MEU 600 including an address generation unit (AGU) 601, an integer execution unit (IEU) 602, a floating point execution unit (FEU) 603, a memory interface unit (MIU) 604, a reorder buffer (ROB) and real register file (RRF) 606. Additionally, execution core 503 includes an internal bus (Bus_EU) 607 and a common bus (Bus_EU/CC) 608 (also referred to above as writeback bus 213). MEU 600, AGU 601, IEU 602, FEU 603 and MIU 604 are all coupled to reservation station 605 via a dispatch bus 609. They are also coupled to Bus_EU/CC 608. AGU 601 is also coupled to Bus_CC of the MEU 600 and to the memory order buffer (MOB) of the memory execution unit. MIU 604 is also coupled to the data cache memory and MEU 600 via bus 610. RS 605 is coupled to the Bus_EU/CC 608 and the Bus_EU 607. RS 605 is also coupled to ROB and RRF 606. ROB and RRF 606 is also coupled to the Bus_EU 607 and the Bus_EU/CC 608. Together, elements 600–610 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 503 may include multiple AGUs, such as 2 or 3, multiple IEUs, such as two, and multiple FEUs, such as two.

Reservation station 605 receives and stores the issued instructions resolving their operands with data from the IEU 602, the FEU 603, the data cache memory, the ROB and RRF 606 and holds them until their operands are all resolved. The RS 605 then dispatches the issued instructions to the AGU 601, the IEU 602, the FEU 603 and the MIU 604 and the MEU 600 as appropriate.

In particular, the load instruction is dispatched as a single operation, whereas the store instruction is dispatched as store address (STA), the address calculation operation, and stored data (STD), the data calculation operation, for a store to the MEU 600 and MIU 604. Similar to instruction fetching, there is no requirement that the load sources or the store destinations be aligned to memory locations. In other words, the load sources of load instructions and store destinations of store instructions may span two cache lines.

Reservation station 605 also schedules Bus_EU/CC 608 for use in returning data from the L2 cache memory or stage 507 via MUX 503. Reservation station 605 schedules Bus_

EU/CC 608 for use by the data cache memory 510, wherein the data cache memory 510 identifies the data on the bus as the data requested from the L2 cache memory (or other external memory) and stores the data. The execution unit may access the desired data to complete any operations dependent on the data. Data cache memory 210 controls whether the data is forwarded to the execution core on Bus_EU/CC 308 by signalling the formatter/sign extension block to allow the data to continue.

The MEU 600, its AGU 601, the IEU 602, FEU 603, and the MIU 604 in turn perform the operations accordingly. In particular, the AGU 601 generates the appropriate linear address. The linear address is computed using a base address, a displacement value, a scale value, an index value and a segment value. In one embodiment, the linear address is 32-bits long with a 20 higher order bits identifying a memory page and the 12 low order bits identifying the off-set within the memory page. The execution results of the integer, floating point and load instructions are held in the ROB 606, and then committed by RRF 606 in the order these instructions were issued. Speculative execution results of the mispredicted branches are not committed, but instead are held in the ROB 606. Execution results due to operations being performed on data containing errors originating from external memory are purged in response to their detections.

Note that the purging of the results clears all resources in a manner very similar to a reset operation. In case of using data with errors, the reservation station 605 and any queued operations awaiting execution are initially cleared, as well as buffers containing unretired, stored operations. ROB 606 is also cleared in one embodiment, once operations are performed, validity indications (e.g., bits) are assigned to indicate that the results are valid and that the operations are ready to become part of the permanent state (e.g., updating the instruction pointer). To prevent the results from becoming part of the permanent state, the validity indications may be cleared.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for performing error correction has been described.

We claim:

1. A method for transferring data between a memory and a first device having a unit requesting the data, said method comprising the steps of:

the requesting unit receiving data on a writeback bus directly from an external memory in response to a data request to allow for immediate use thereon;

correcting the data, in parallel with the requesting unit receiving the data, if the data has an error to produce error corrected data and storing the corrected data in an internal memory within the first device via the writeback bus;

indicating to the requesting unit that the data contains the error;

flushing the first device, including the step of invalidating entries in a reorder buffer that stores data results from execution with erroneous data to purge the data results;

the requesting unit reissuing the data request; and providing the error corrected data from the internal memory to the requesting unit via the writeback bus in response to the requesting unit reissuing the data request and in a clock cycle immediately following the clock cycle in which the data is directly received by the requesting unit.

2. The method defined in claim 1 wherein the step of correcting the data includes correcting single bit errors in the data.

3. The method defined in claim 1 wherein the step of receiving includes receiving a plurality of blocks of data.

4. The method defined in claim 3 wherein the plurality of blocks are received in successive clock cycles.

5. The method defined in claim 3 wherein only one of said plurality of blocks includes the data desired by the requesting unit, and wherein the step of sending includes sending only said one of the plurality of blocks to said requesting unit.

6. A method for transferring data to a first device having a unit requesting the data, said method comprising the steps of:

receiving the data from an external memory source;

sending the data to the requesting unit of the first device using a writeback bus;

correcting any error in the data to produce error corrected data;

flushing the first device to remove results generated by the requesting unit operating with the faulty data, wherein the step of flushing comprises invalidating entries in a buffer memory storing results from execution with erroneous data in order to purge the results;

storing the corrected data in a cache memory of the first device via the writeback bus; and providing the error corrected data, via the writeback bus, to the requesting unit in a clock cycle immediately subsequent to the data being sent to the requesting unit.

7. The method defined in claim 6 wherein the step of correcting the data includes correcting single bit errors in the data.

8. The method defined in claim 6 wherein the corrected data is provided from the cache memory.

9. A processor for use in a computer system having at least one memory external to said processor, said processor comprising:

an internal bus;

an execution core coupled to the internal bus and executing instructions using data;

a cache memory coupled to the internal bus for storing data for use by the processor;

an error correction logic coupled to the internal bus and operable to perform error correction on data received from said at least one memory that has an error in parallel to the data being received and immediately used by the execution core;

a controller coupled to the execution core and the error correction logic and operable to cause the execution core to be purged of results from the execution core operating with erroneous data and to cause the error correction logic to send corrected data to the cache memory in a clock cycle immediately subsequent to the execution core receiving the faulty data to enable the execution core to obtain the corrected data; and a reorder buffer having a plurality of entries storing data results from the execution core operating with erroneous data, wherein the reorder buffer invalidates said plurality of entries when the execution core is purged.

10. The processor defined in claim 9 wherein the processor obtains the data from said at least one memory in response to a data request, and further wherein the execution core obtains the corrected data in response to the data request being repeated.

11. The processor defined in claim 9 wherein the error correction logic is within bus controller logic within the processor.

12. The processor defined in claim 9 wherein the cache memory comprises an L1 cache memory.

13. The processor defined in claim 9 wherein said at least one memory comprises an L2 cache memory, such that said error correction logic performs error correction on data received from the L2 cache memory.

14. The processor defined in claim 9 wherein the error correction logic performs single bit error correction.

15. The processor defined in claim 9 further comprising staging logic coupled to the error correction logic and the controller to stage the corrected data for one clock.

16. A computer system comprising:
    a first bus for communicating information;
    a main memory coupled to the first bus;
    a second bus for communicating information;
    a first cache memory coupled to the second bus;
    a processor coupled to the first bus and the second bus, wherein the processor comprises
        an internal bus,
        an execution core coupled to the internal bus and executing instructions using data,
        a second cache memory coupled to the internal bus for storing data for use by the processor,
        an error correction logic coupled to the internal bus and operable to perform error correction on data received from an external source, and
        a reorder buffer having a plurality of entries;
    wherein the processor issues data requests to the first cache memory and upon receipt of data corresponding to the data requests, forwards data directly to the execution core via the internal bus for use therein while, in parallel, the error correction logic performs error correction on the data and corrects the data if the data has an error to produce error corrected data, and
    further wherein the processor further comprises a controller coupled to the execution core and the error correction logic and operable to cause the execution core to be purged of results from the execution core operating with faulty data and to cause the error correction logic to send corrected data to the second cache memory in a clock cycle immediately subsequent to the execution core receiving the faulty data to enable the execution core to obtain the corrected data, and wherein said the plurality of entries of the reorder buffer store data results from the execution core operating with faulty data, and wherein the reorder buffer invalidates said plurality of entries when the execution core is purged.

17. The computer system defined in claim 16 wherein the execution core obtains the corrected data in response to a data request being repeated.

18. The computer system defined in claim 16 wherein the second cache memory comprises an L1 cache memory.

19. The computer system defined in claim 16 wherein the error correction logic performs single bit error correction.

20. The computer system defined in claim 16 wherein the processor further comprises staging logic coupled to the error correction logic and the controller to stage the corrected data for one clock.

21. A computer system comprising:
    a first bus for communicating information;
    a main memory coupled to the first bus;
    a second bus for communicating information;
    a first cache memory coupled to the second bus;
    a processor coupled to the first bus and the second bus, wherein the processor and first cache memory are contained in a single integrated circuit package, and wherein the first bus comprises a dedicated bus, said processor comprising
        an internal bus,
        an execution core coupled to the internal bus and executing instructions using data,
        a second cache memory coupled to the internal bus for storing data for use by the processor, and
        an error correction logic coupled to the internal bus and operable to perform error correction on data received from an external source;
    wherein the processor issues data requests to the first cache memory and upon receipt of data corresponding to the data requests, forwards data directly to the execution core via the internal bus for use therein while, in parallel, the error correction logic performs error correction on the data and corrects the data if the data has an error to produce error corrected data, and
    further wherein the processor further comprises a controller coupled to the execution core and the error correction logic and operable to cause the execution core to be purged of results from the execution core operating with faulty data and to cause the error correction logic to send corrected data to the second cache memory in a clock cycle immediately subsequent to the execution core receiving the faulty data to enable the execution core to obtain the corrected data.

22. The computer system defined in claim 21 wherein the processor further comprises a reorder buffer having a plurality of entries storing data results from the execution core operating with faulty data, and wherein the reorder buffer invalidates said plurality of entries when the execution core is purged.

23. The computer system defined in claim 16 or 21 wherein said first cache memory comprises an L2 cache memory, such that said error correction logic performs error correction on data received from the L2 cache memory.

24. A processor fabricated on an integrated circuit, the processor comprising:
    a plurality of pads;
    an error correction logic coupled to the plurality of pads and operable to perform error correction on erroneous data received on the plurality of pads;
    a multiplexor having a first input coupled to the plurality of pads and a second input coupled to an output of the error correction logic;
    a writeback bus coupled to the multiplexor;
    an execution core coupled to the writeback bus and operable to receive requested data directly from the plurality of pads for immediate use;
    a first level cache memory coupled to the writeback bus; and
    a controller coupled to the execution core and the multiplexor and operable to signal results generated by the execution core operating with erroneous data to be purged and operable to select error corrected data as an output of multiplexor onto the writeback bus in a clock cycle immediately subsequent to the execution core receiving the faulty data to enable the execution core to obtain the corrected data.

25. The processor defined in claim 24 wherein the execution core receives the error corrected data in response to a repeated data request.

26. The processor defined in claim 24 wherein the error correction logic is within bus controller logic within the processor.

27. The processor defined in claim 24 wherein the error correction logic performs error correction on data received on the plurality of pads from an L2 cache memory.

28. The processor defined in claim 24 wherein the error correction logic performs single bit error correction.

29. The processor defined in claim 24 further comprising staging logic coupled to the error correction logic and the controller to stage the corrected data for one clock.

* * * * *